Figure 3:
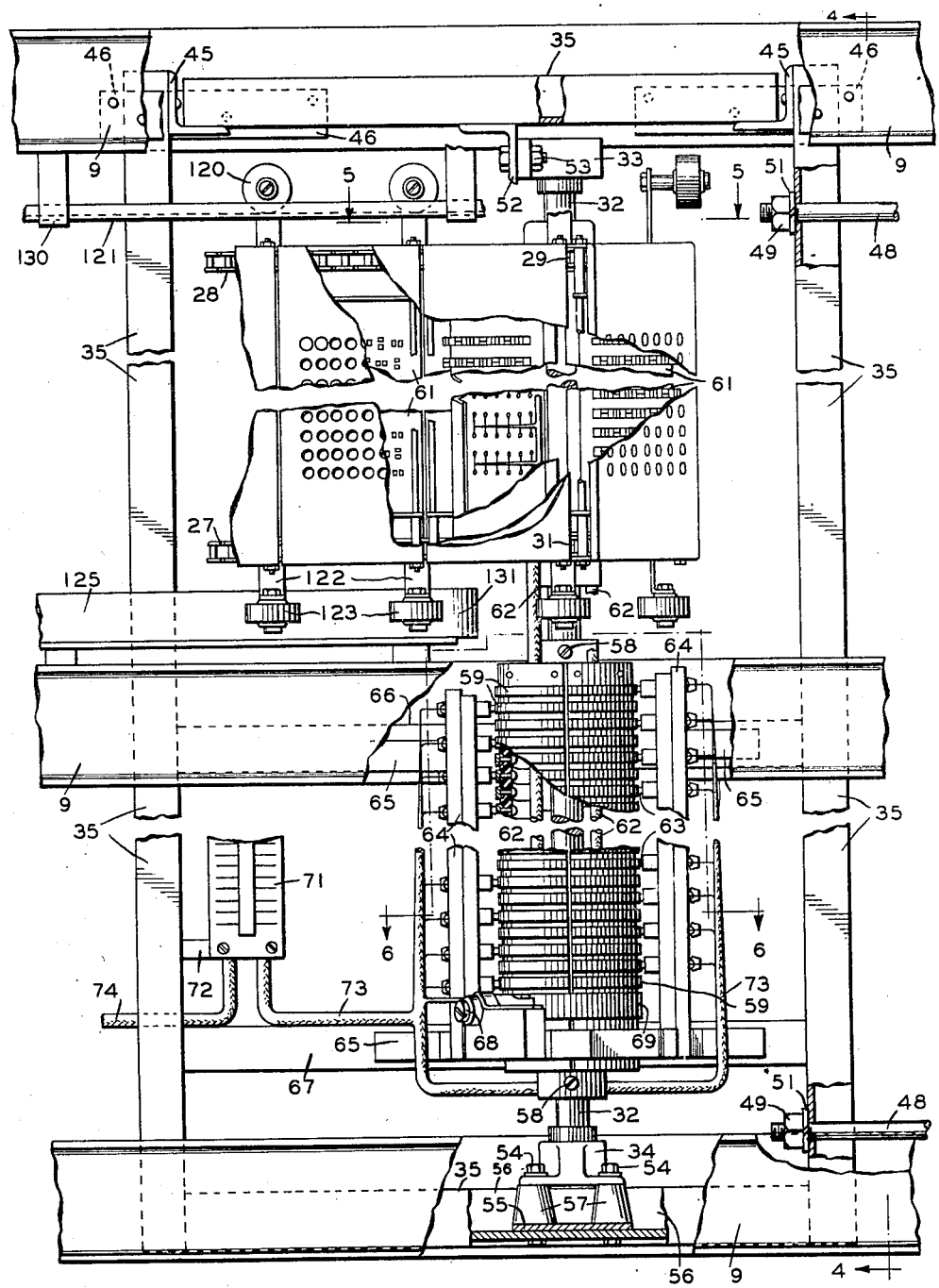

March 7, 1944.　　M. L. HASELTON ET AL　　2,343,294
TRAVELING MESSAGE SIGN
Filed July 24, 1940　　11 Sheets-Sheet 1
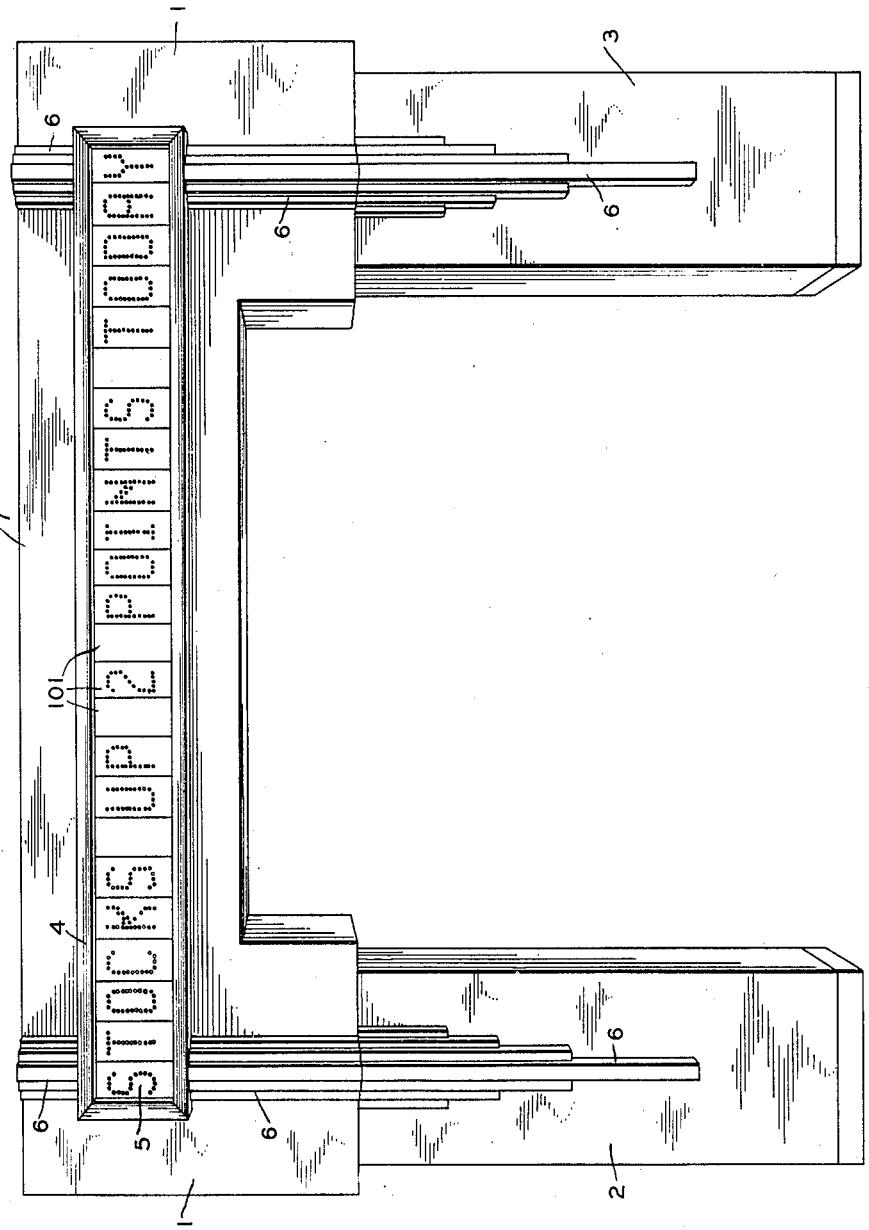
INVENTORS
M. L. HASELTON
C. S. WHITNEY, JR.
BY
ATTORNEY

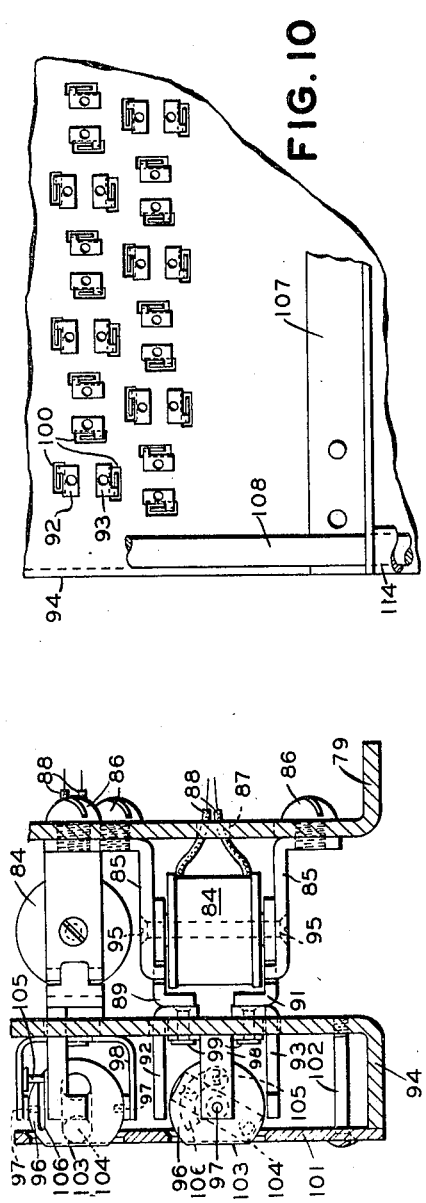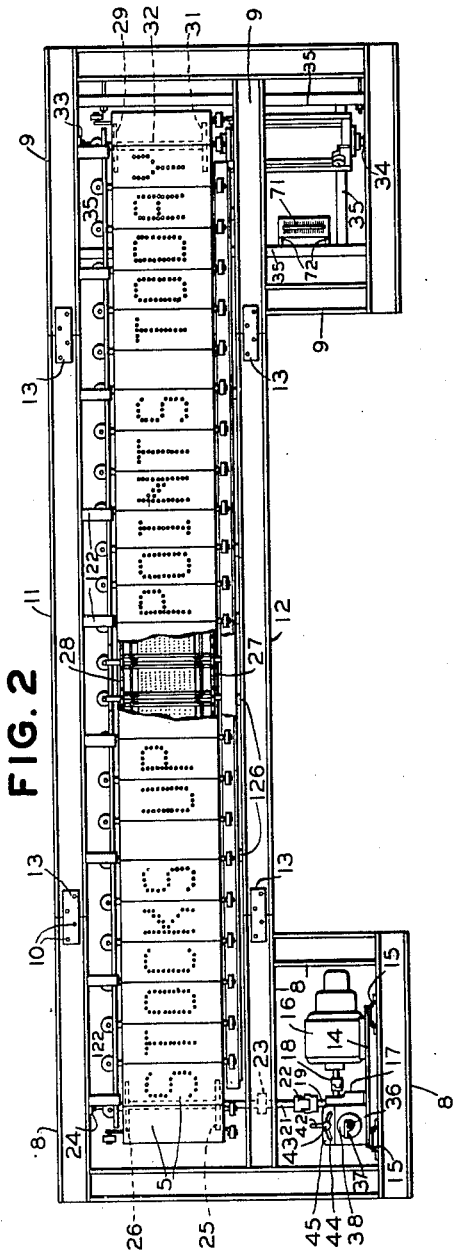

March 7, 1944.  M. L. HASELTON ET AL  2,343,294
TRAVELING MESSAGE SIGN
Filed July 24, 1940  11 Sheets-Sheet 5

INVENTORS
M. L. HASELTON
BY C. S. WHITNEY, JR.
ATTORNEY

March 7, 1944.  M. L. HASELTON ET AL  2,343,294
TRAVELING MESSAGE SIGN
Filed July 24, 1940  11 Sheets-Sheet 6

INVENTORS
M. L. HASELTON
C. S. WHITNEY, JR.
BY
ATTORNEY

March 7, 1944.   M. L. HASELTON ET AL   2,343,294
TRAVELING MESSAGE SIGN
Filed July 24, 1940   11 Sheets-Sheet 7

INVENTORS
M. L. HASELTON
C. S. WHITNEY, JR.
BY
ATTORNEY

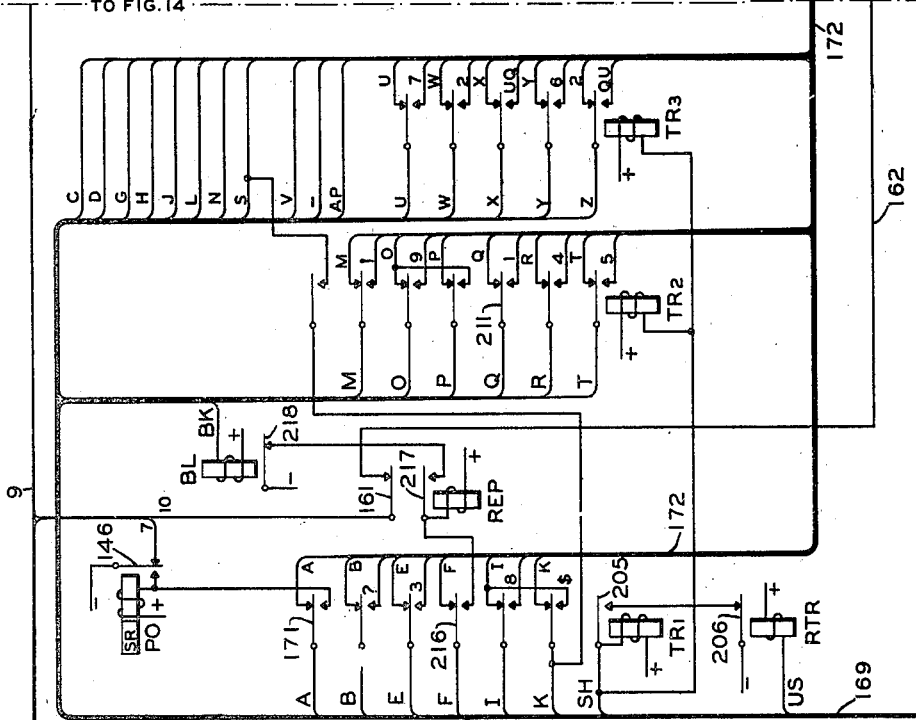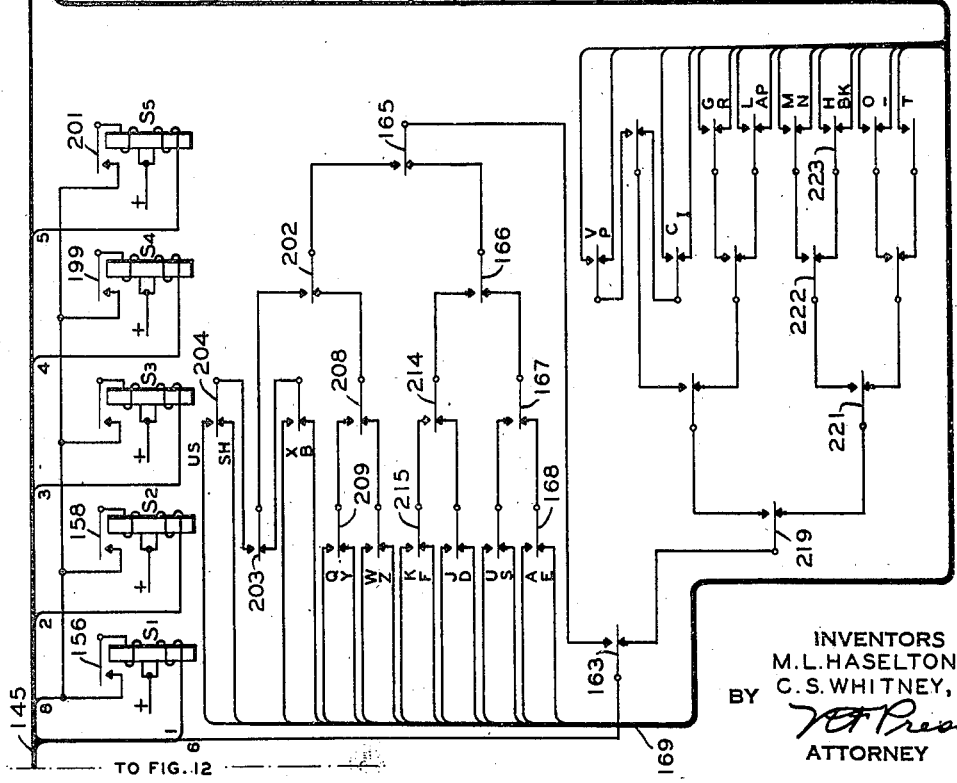
FIG. 13

March 7, 1944.     M. L. HASELTON ET AL     2,343,294
TRAVELING MESSAGE SIGN
Filed July 24, 1940     11 Sheets-Sheet 11

INVENTORS
M. L. HASELTON
C. S. WHITNEY, JR
BY
ATTORNEY

Patented Mar. 7, 1944

2,343,294

UNITED STATES PATENT OFFICE 2,343,294

TRAVELING MESSAGE SIGN

Merton L. Haselton, Rye, and Charles S. Whitney, Jr., Brooklyn, N. Y., assignors to The Teleregister Corporation, New York, N. Y., a corporation of Delaware Application July 24, 1940, Serial No. 347,336

22 Claims. (Cl. 40—53)

This invention relates to a system for reproducing and exhibiting characters or inscriptions for advertising and other purposes, and particularly to that type of system in which the characters are formed and displayed upon a traveling mosaic. The mosaic comprises groups of visual elements which may be set or arranged, either singly or in combination, to constitute units in a field and are adapted either to blend with a suitable background or be distinct therefrom by the selective operation of suitable composing means to form letters, numbers, words or other symbols which are passed across the field of vision at a relatively high rate of speed.

In systems of the type heretofore proposed comprising large display boards for advertising, manufacturing and trade names of various products and for the dissemination of news items and the like, the characters comprising the message are usually formed by the selective operation of shutters or flaps carried by a moving belt or web or by the successive operation of electric lamps to create the illusion of movement. Such systems are necessarily slow in operation for the reason that the time required to compose the characters, in the case of the moving belt type of display system, effectively prevents the operation of such systems at speeds for which the present invention is adapted. In the case of display signs wherein the illusion of movement is created by successively illuminating and extinguishing incandescent electric lamps, the speed of operation is obviously limited by the rapidity with which the lamps can be lighted and extinguished. When the operating circuit through the lamps is interrupted, the lamps are not immediately extinguished due to the time required for the filament to cool below the point of incandescence. This sluggish action of the filament causes the characters to be malformed due to the presence of trailing edges thereon when attemps are made to operate such systems at high speeds and the symmetry of the characters is thus destroyed and the intelligibility and appeal of the message greatly decreased. Furthermore, these systems are not adapted to operate reliably at high speeds due to the cumbersome methods employed for composing the mosaic and the difficulty in maintaining reliable operating circuits for the lamp type of moving sign at high speeds.

The system of the present invention is adapted to display advertising matter, news items, financial reports, and information relating to the movements of aircraft or the trading of securities and the like clearly, forcibly, attractively and at a relatively high rate of speed, whereby the information or message displayed may be viewed simultaneously by a large number of persons.

Among the objects of the present invention is the provision of means for displaying messages comprising advertising matter, news flashes and the like by means of a moving mosaic having the characters thereof particularly sharp, clear and distinct and which operates reliably at a relatively high rate of speed.

Another of the objects resides in the provision of means for quickly and easily varying at will the subject matter of the displayed messages thereby to obtain practically unlimited flexibility of operation and versatility of the messages.

Another of the objects is the provision of a simplified composing structure for controlling the visual indicating elements comprising the mosaic whereby the selected characters may be set up while the mosaic is traveling at a relatively high rate of speed.

Another of the objects resides in the novel structure and disposition of the indicating elements of the mosaic whereby the characters are distinctly formed and retained by the force of magnetic attraction.

Still another of the objects is the provision of means for controlling the operation of the display means at a distance over a line to display any desired message and for controlling the supply of power to the display device and control mechanism therefor by signals over the line.

Another of the objects of the invention is the provision of means controlled from a distance for causing a message to be set up in the mosaic and repeated without altering the settings of the indicating elements of the mosaic.

A still further object resides in the organization and arrangement of parts whereby a small number of moving parts is employed to provide a simple system in which the first cost and maintenance are relatively low and in which reliability of operation is obtained by a novel combination of circuits and parts including telegraph distributors and standard commercial telephone relays.

Additional objects and advantages of the invention will be apparent from the following description taken in connection with the accompanying drawings and specifically pointed out in the appended claims.

Figure 4:
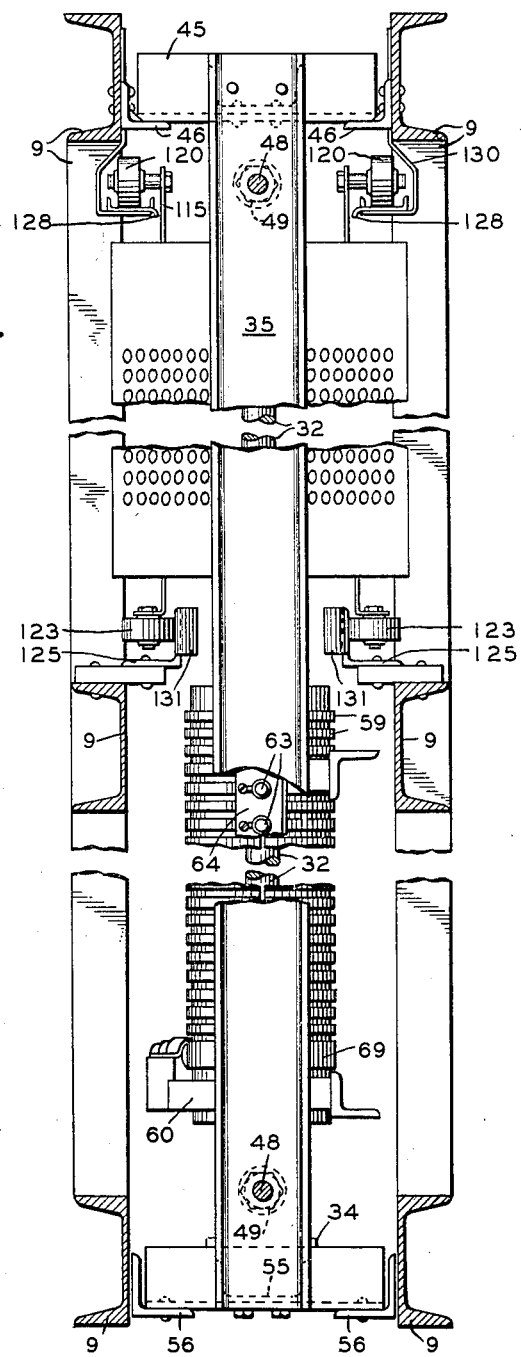
Figure 5:
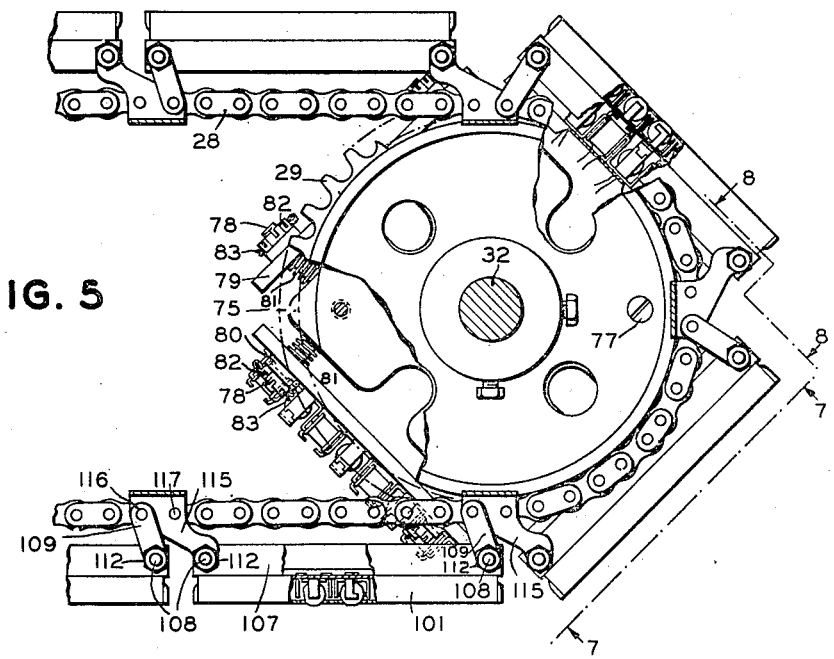
Figure 6:
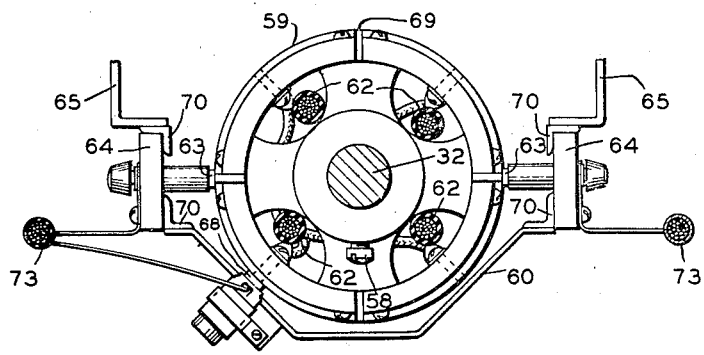
Figure 7:
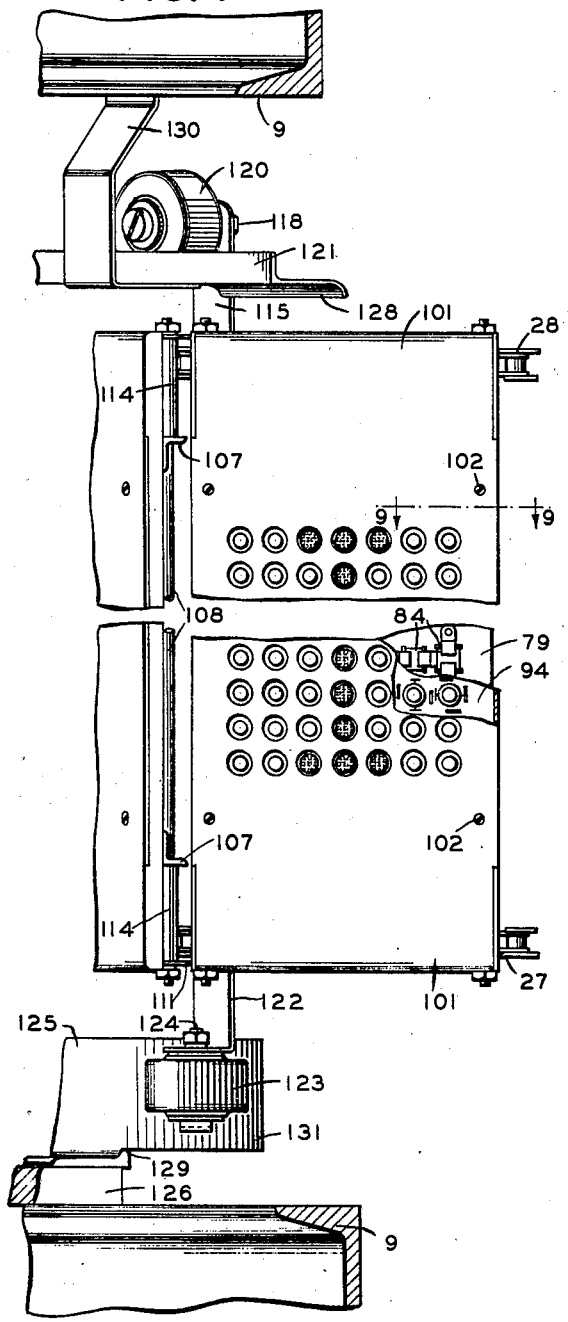
Figure 8:
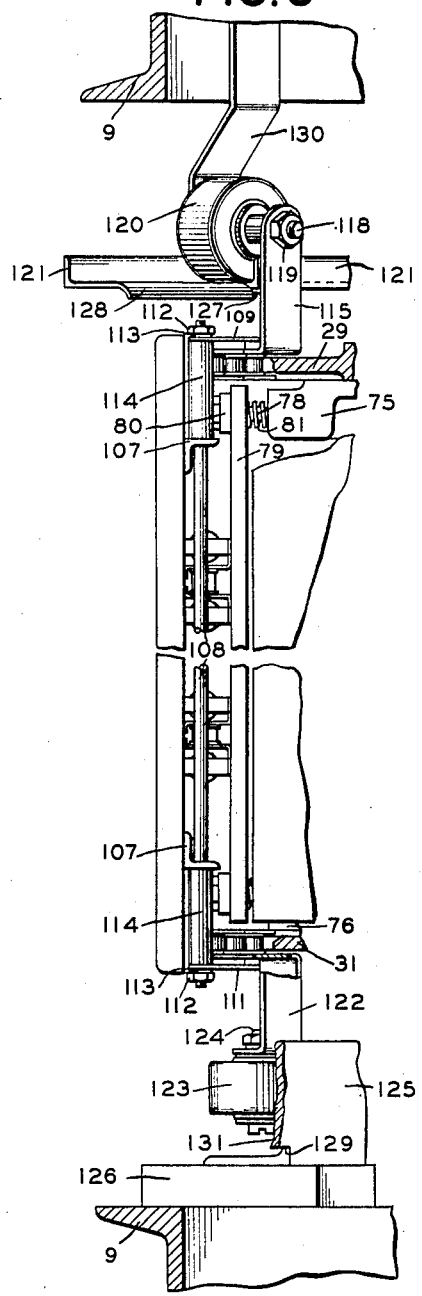
Figure 12:
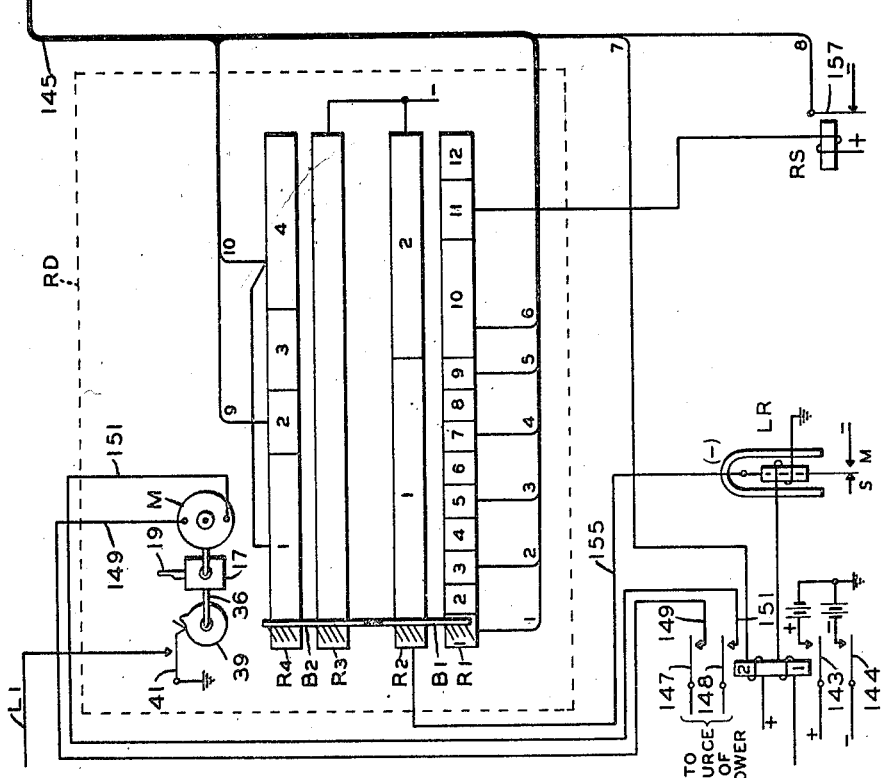
Figure 11:
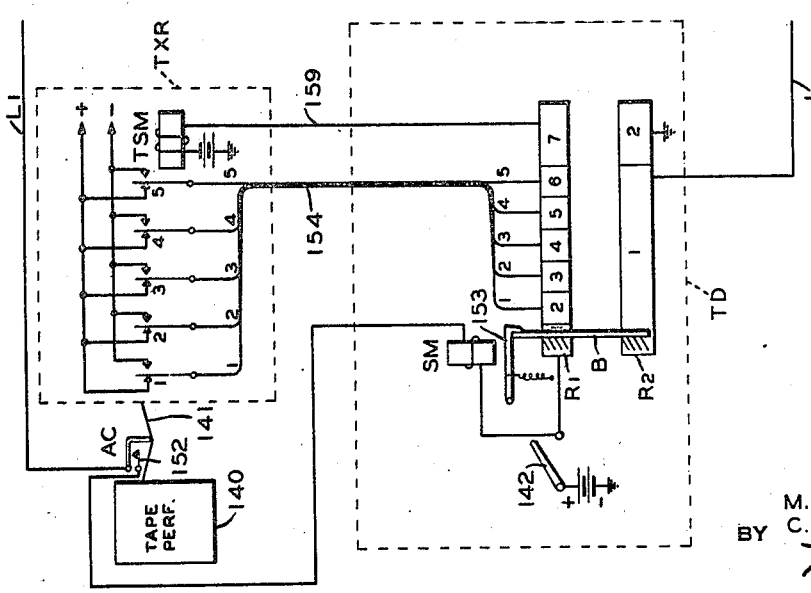
Figure 14:
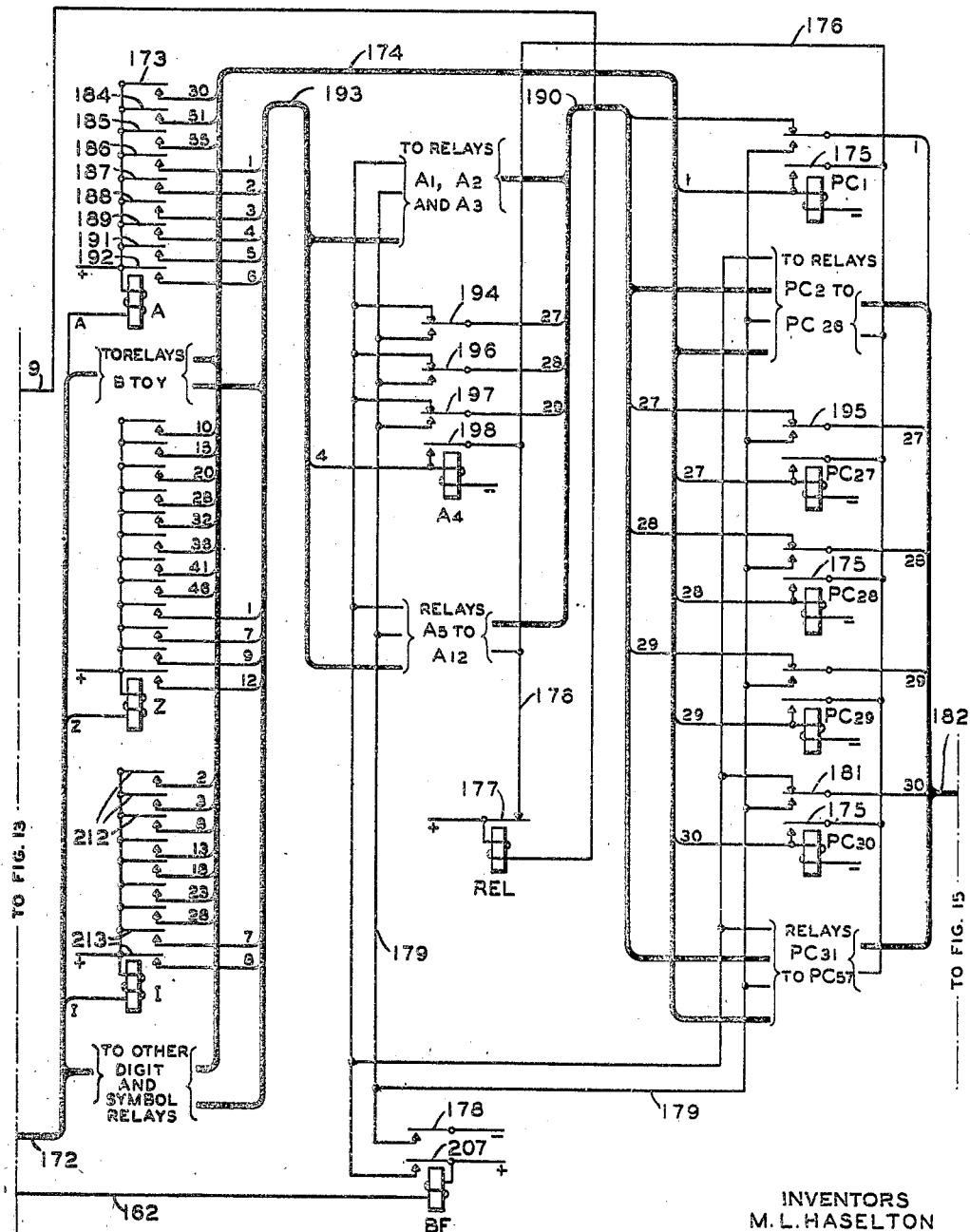
Figure 15:
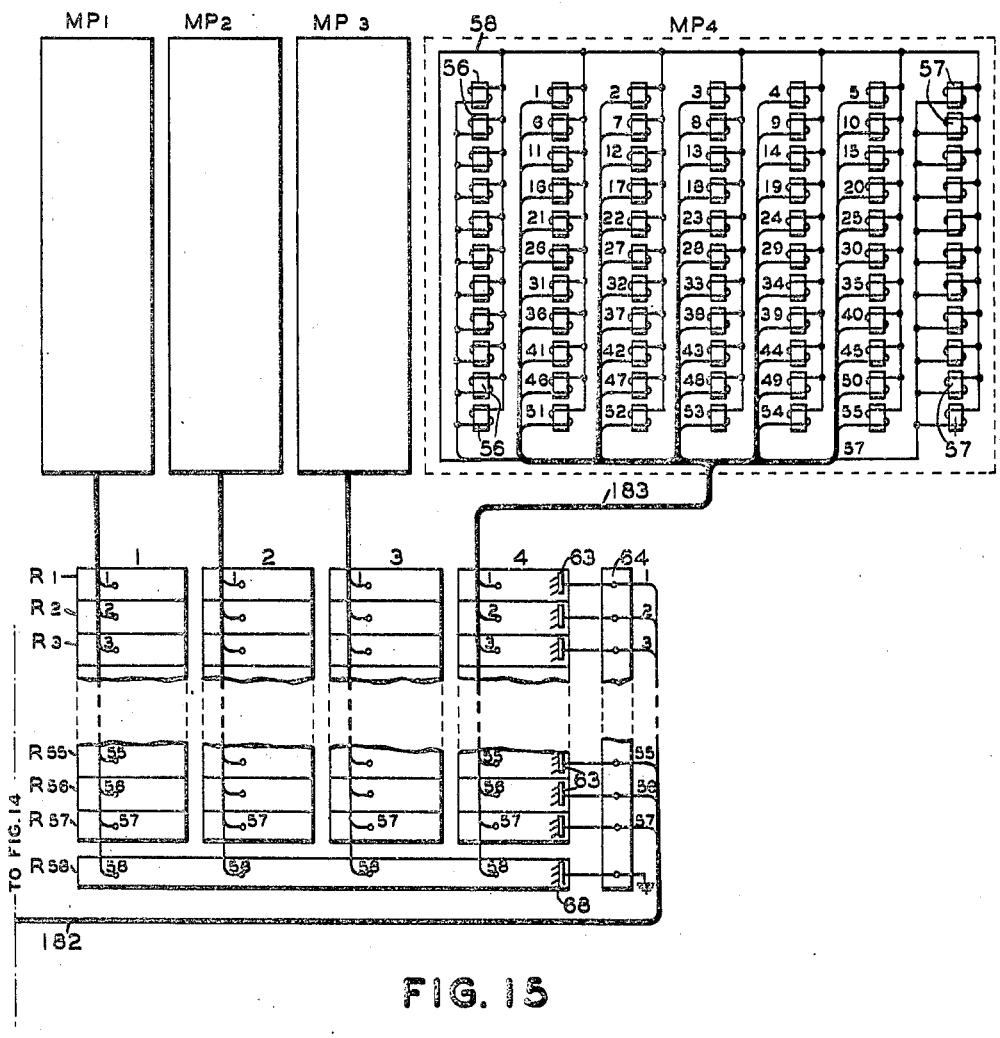

In order that the invention may be more fully understood, reference will be had to the following drawings disclosing one embodiment thereof in which:

Fig. 1 is a view of a message sign illustrating one embodiment of the invention, Fig. 2 is a view in elevation of the message sign of Fig. 1 with the casing removed, Fig. 3 is a view, partly broken away, of a portion of the apparatus of Fig. 2, Fig. 4 is an end view of the apparatus of Fig. 3, taken along the line 4—4 of Fig. 3, Fig. 5 is a view, partly broken away and somewhat enlarged, taken along the line 5—5 of Fig. 3, Fig. 6 is a view, somewhat enlarged, taken along the line 6—6 of Fig. 3, Fig. 7 is a view taken along the line 7—7 of Fig. 5, Fig. 8 is a view taken along the line 8—8 of Fig. 5 with certain mounting details added thereto, Fig. 9 is a view, partly in section, illustrating certain details of the display elements and operating mechanism therefor, taken along the line 9—9 of Fig. 7, Fig. 10 is a rear view of a portion of one of the plates comprising the traveling mosaic illustrating certain construction features thereof, Fig. 11 illustrates, in diagrammatic form, a transmitter suitable for use with the system of the present invention, Fig. 12 shows, in diagrammatic form, certain receiving equipment controlled by the transmitter of Fig. 11, Fig. 13 shows a group of decoding relays and certain control relays, Fig. 14 shows a plurality of character composing relays and grouping relays, Fig. 15 illustrates, in diagrammatic form, the marker heads including the character composing magnets and operating circuits therefor, Fig. 16 shows, in tabular form, a permutation code suitable for use with the system of Figs. 11 to 15, Fig. 17 illustrates the circuit connections set up to the magnets of Fig. 15 for composing the letters of the alphabet and a plurality of other characters and symbols to be displayed according to one embodiment of the invention, Fig. 18 shows the circuit connections to the grouping relays of Fig. 14 and, Fig. 19 represents, in diagrammatic form, the composing magnets of one of the marker heads of Fig. 15, each of the magnets bearing a selection designation number.

Referring now to the drawings on which like numerals of reference are employed to designate like parts, there is shown on Fig. 1 thereof a traveling message display sign comprising an upper housing indicated generally by the numeral 1, and two lower housings represented by the numerals 2 and 3 respectively. The housing 1 is provided with an aperture 4 through which the information set up on a traveling mosaic 5 is displayed. The message sign illustrated on Fig. 1 may be placed before a suitable background and viewed from one side only or, if desired, the message set up on the traveling mosaic may be viewed from both sides of the sign with equal facility by merely providing a duplicate aperture 4 in the rear or opposite side of the sign in which latter case, the decorative effect such, for example, as that illustrated at 6 would preferably be provided on both sides of the casings 1, 2 and 3. The casing 1 includes a section 7 varying in length in accordance with the number of character display plates or sections employed in the traveling mosaic.

In the specific embodiment of the invention illustrated on Fig. 1 of the drawings, the mosaic comprises fifty two sections or plates of which twenty-four are included within the aperture 4. The manner in which the structure illustrated on Figs. 1 and 2 of the drawings is adapted to employ mosaics having a greater or lesser number of plates will best be understood by consideration of Fig. 2 of the drawings on which is shown a framework 8 connected to the framework 9 by the frame members 11 and 12, the connection being firmly established by the bonding plates 13 secured thereto in any suitable manner, as by the bolts 10. The length of the frame members 11 and 12 varies in accordance with the number of character forming plates comprising the traveling mosaic thereby providing an arrangement wherein the frame sections 8 and 9 and the apparatus mounted thereon may be employed for display signs of different sizes in accordance with the number of plates comprising the traveling mosaic and the length of the frame members 11 and 12. The frame members 8 and 9 are supported by suitable frame structures or columns within the housings 2 and 3.

The frame 8 is provided with a mounting support 14 resiliently mounted thereon by the cushion mountings 15 which may be of rubber or other resilient material suitable for the purpose, thereby providing means for reducing the amount of noise and vibration of the sign in operation by preventing the vibrations of the mounting 14 from being transmitted to the frame member 8.

An electric motor 16 is connected to the gear box 17 by the flexible coupling 18. A shaft 19 extends from the gear box and is connected to the shaft 21 by the flexible coupling 22. The shaft 21 is supported by the resiliently mounted bearings 23 and 24 attached to the frame 8 and is provided with a pair of sprocket wheels 25 and 26 secured thereto which engage the endless chains 27 and 28 respectively, these chains also passing over the sprocket wheels 29 and 31 affixed to the shaft 32 rotatably mounted by the bearings 33 and 34 secured to an adjustable frame 35 supported by the frame 9.

The gear box 17 is also provided with a shaft 36 upon which is mounted a brush arm 37 adapted to rotate continuously as the motor operates, thereby causing the brushes thereof to traverse the segments of the receiving distributor 38. The shaft 36 is provided with a cam 39, Fig. 12, adapted to close the contacts 41 during each revolution of the shaft 36, the gear ratio between the shafts 21 and 36 being such that the chains 27 and 28 and the mosaic connected thereto will be moved by the shaft 19 through a distance equal to the distance between successive characters set up on the display plates of the mosaic during the time of one revolution of the shaft 36. The contacts 41 are adjusted by means of the lever 42, Figs. 2 and 12 such that the time of closure of the contacts 41 with respect to the rotation of the shaft 36 may be varied at will by adjustment of the lever 42, the setting of the lever 42 being maintained by the screw 43 passing through the slot 44 in the guide plate 45 affixed to the distributor face plate 38. The contacts 41 are employed for setting a transmitting distributor into operation as will hereinafter be described in more complete detail, the movement of the lever 42 and the contacts 41 thereof corresponding to what is known in the telegraph art as orientation or synchronization of the transmitting and receiving distributors whereby the most suitable portion of the signals received by the receiving distributor is employed for controlling the receiving equipment.

Referring now to Figs. 3 and 4 of the drawings, it will be noted that the framework 35 includes two cross members 45 secured to the upper end thereof which slidably engage the angle members 46 secured to the upper portion of the frame 9, whereby the frame 35 may be adjustably positioned with respect to the frame 9 by the bolts 48 and the nuts 49 thereof, the bolts 48 extending through the frames 35 and 9 in the manner indicated on the drawings.

The lock washers 51 inserted between the nuts 49 and the frame 35 maintain the frame 35 in any of its adjusted positions. The nuts 49 and bolts 48 thus provide an arrangement whereby the chains 27 and 28 may be given the proper adjustment by lateral movement of the shaft 32 and sprocket wheels 29 and 31. The bearing 33 is secured to the angle member 52 of the frame 35 by the bolts 53 and the bearing 34 is secured to the lower portion of the frame 35 by the bolts 54 which pass through a mounting plate 55 attached to the angle members 56 of the frame 35. The bearing 33 is preferably resiliently mounted in rubber in any well known manner and the bearing 34 rests on a resilient spacing member 57 whereby the vibrations of the shaft 32 are prevented from being transmitted to the framework 35.

A commutator is secured to the shaft 32 by the screws 58, Figs. 3 and 6, the commutator comprising fifty-seven segmented rings 59 and a feeder ring 69 connected to the marker heads 61 by the cables 62 extending within the commutator and marker heads respectively through the spaces in the structure provided therefor. Fifty-seven brushes designated by the numeral 63 are supported by the brush holders 64 secured by means of the mountings 65 to the members 66 and 67 of the frame 35. The member 60 supports a brush 68 for engagement with the feeder ring 69, the angle strips 70 being provided for reinforcement of the brush holders 64 and for attaching the mounting strip 60. A terminal strip 71 is secured to the frame 35 by the mounting members 72. A cable 73 is provided for connecting the terminals of the terminal strip with the brushes 63 and 68. The electrical connections between the terminal strip 71 and the control relays are established by the cable 74 having one end thereof connected to the terminal strip 71.

Secured to the sprocket wheels 29 and 31 are the end plates 75 and 76, Figs. 5 and 8, attached thereto by the screws 77. Each of the end plates is provided with eight studs 78 projecting therefrom upon which are mounted the marker plates 79. A spring 81 mounted on each of the studs 78 between the marker plate and the end plates maintains the marker plate in resilient engagement with the washers 80 and the nuts 82 threaded on the studs 78 and locked thereto in any suitable manner, as by the cotter pins 83 passing through the nuts and the studs. The springs 81 are of sufficient strength to cause the marker plate to be uniformly seated against the character display plates during the time that the display elements thereof are being positioned to form the selected characters.

Each marker plate includes seventy-seven electro-magnets 84 mounted thereon by the brackets 85 attached to the marker plate 79 by the screws 86, Fig. 9. The marker plate is made of any suitable non-magnetic material such, for example, as brass and is provided with a plurality of apertures 87 therein through which the insulated conductors 88 extend, thereby completing circuits by way of the cables 62, Fig. 3, from the commutator rings to the electro-magnets 84. Each electro-magnet is provided with a pair of pole pieces 89 and 91 adapted to be brought into operative engagement with complementary pole pieces 92 and 93 of the display plate assemblies 94 as these assemblies pass the marker plates. The pole pieces 89 and 91 and the supporting brackets 85 of each electro-magnet 84 are secured together as by riveting at 95. The mounting brackets 85 are preferably of non-magnetic material such as brass, the mounting arrangement of the electro-magnets 84, Fig. 9, being such that each electro-magnet is mounted with the axis thereof at right angles to the axis of each adjacent electro-magnet whereby a minimum of magnetic interference between the magnets is set up regardless of the pattern of the character or symbol represented thereby. Provision is made in the structure whereby, by adjusting the nuts 82, the marker plate pole pieces may be prevented from making physical contact with the complementary pole pieces 92 and 93 of the display plate assemblies as these assemblies pass the marker plates, satisfactory operation having been obtained with a separation of .040" between the marker plate pole pieces 89 and 91 and the complementary pole pieces.

Each of the character plates is provided with seventy-seven indicating elements 96 pivotally mounted on the bearings 97 carried by the bearing support 98 attached to the plate 94 in any suitable manner, as by the rivets 99. The rotatable indicating elements 96 may be made of any suitable non-magnetic material such, for example, as a yellow moulded plastic known as cellulose acetate or urea formaldehyde. A mask 101 is secured to the plate 94 by the screws 102, the mask 101 and the plate 94 being of non-magnetic material to prevent magnetic interference in the operation of the indicating elements 96 as will hereinafter be described in greater detail. The mask 101 is suitably finished on the outer side thereof with an appropriate finish, such as black, and provided with seventy-seven apertures through which the corresponding indicating elements 96 are selectively displayed. Each of the elements 96 is preferably spherical in shape and has a flat portion 103 thereof finished so as to be practically indistinguishable from the finish of the mask 101 when the element is in its non-display position with the flat portion in substantial alignment with the corresponding aperture of the mask as shown on Fig. 9 of the drawings, the finish extending sufficiently beyond the flat portion 103 to cause the indicating element 96 to blend with the mask 101 when the element is set in its non-display position.

A permanent magnet 104 is mounted within each indicating element 96 and rotates with the indicating element under the influence of the magnetic field set up in the pole pieces 92 and 93 by the electromagnet 84 in accordance with the direction of flow of current through the winding of the electromagnet to a position such that the indicating element blends with the background of the mask or is distinct therefrom, the limit of movement of the indicating element 96 being controlled by the end of a slotted portion 106 of the indicating element coming into engagement with a stop pin 105 affixed to the mounting bracket 98. The force of attraction between the ends of the magnet 104 and the pole pieces 92 and 93, after the pole pieces 92 and 93 have moved away from the pole pieces 89 and 91, is of sufficient strength to cause either end of the slot 106 to remain in contact with the pin 105 thereby maintaining the element 96 in either of its set positions until the pole pieces 92 and 93 are again brought into engagement with the pole pieces 89 and 91 and the flux set up by the magnets 84 is of the required polarity to effect a change in the setting of the indicator element.

Attached to the rear of each character display plate are two transverse bearing plates or brackets 107, Figs. 5, 7, 8 and 10, through which pass the bearing rods 108, the rods also passing through the supports 109 and 111 pivotally mounted at 116 on the chains 28 and 31 respectively. Each bearing rod 108 is provided with a shoulder at each end thereof against which the supports 109 and 111 are respectively clamped by the nuts 112 and held securely in the clamped position by the lock washers 113 interposed between the nuts 112 and the supports 109 and 111 respectively. The character plate is maintained in proper alignment by the spacing sleeves 114 interposed between the brackets 107 and the supports 109 and 111 respectively. A support 115 is mounted on the chain 28 at the points designated 116 and 117, Fig. 5, the support carrying with it a bearing rod 108 pivotally mounted at one end of the adjacent character plate. A bearing shaft 118, Figs. 7 and 8, is secured to the support 115 by the nut 119. A roller 120 is mounted on the shaft 118 and is adapted to roll along the track 121 secured by the brackets 130 to the upper frame sections 8, 11 and 9 of the framework, thereby supporting that portion of the chains and the character plates pivotally mounted thereon extending between the sprocket wheels.

Affixed to the chain 31 is a plurality of supports 122 to each of which is clamped one end of the associated bearing rod. A roller 123 is pivotally mounted by the bearing screw 124 attached to each support 122, the roller engaging the track 125 affixed to the frame sections 8, 12 and 9 by the supports 126. The track 121 is preferably of channel construction having one side of the channel cut at 127, Figs. 7 and 8, and bent downward as indicated by the numerals 128 to facilitate the engagement of the roller 120 with the track 121 as the associated character plate leaves the marking head. The track 125 has one end of the horizontal portion thereof cut away at 129 and the corresponding vertical portion bent inwardly at 131 to facilitate the engagement of the track by the roller 123 as the associated character plate moves away from the marker head. The tracks 121 and 125 are also provided with end portions 128 and 131, Fig. 4, respectively adapted to be engaged by the rollers 120 and 123 as the character plates move away from the driving sprocket wheels 26 and 25. From the foregoing it will be noted that the tracks 121 and 125 are discontinuous, there being one track 121 and one track 125 on one side of the message sign and a corresponding track 121 and 125 on the other side of the message sign.

Referring now to Fig. 11 of the drawings, there is shown thereon a tape perforator 140 which may be either a keyboard operated perforator or a receiving reperforator for perforating a tape 141 in accordance with the message to be displayed by the traveling sign, the tape 141 also including perforations comprising certain control signals as will hereinafter be described in more complete detail. Each of the message signals perforated in the tape 141 comprises a five unit permutation code signal, the letter signals being preceded by an unshift signal and the remaining character signals being preceded by a shift signal as is well known in the telegraph art. A permutation code arrangement suitable for use with the system of Figs. 11 to 15, is illustrated on Fig. 16 of the drawings, which arrangement is illustrative of the many different characters which the system is adapted to display by the traveling mosaic of the receiving apparatus.

When the tape perforator is operated to set up a message on the perforated tape 141, switch 142 is moved to its closed position and the tape perforations comprising the message signals pass into a tape transmitter TXR. The closure of switch 142 applies positive battery to the distributor start magnet SM and to segment 1 of ring R1, brush B, segment 1 of ring R2 of the transmitting distributor TD, from whence the circuit is continued by way of line L, winding 1 of the power supply relay PS at the receiving station, Fig. 12, winding of the line relay LR and thence to ground thereby causing relay PS to operate and at its armatures 143 and 144 apply positive and negative battery to the conductors designated + and − respectively of the receiving apparatus of Figs. 12 to 15. Relay LR is a polarized relay responsive to negative signals only and, therefore, does not operate at this time. Relay PS locks from positive battery at its armature 143 which, it will be understood, is connected to one end of winding 2 of relay PS, and thence by way of winding 2 of relay PS, conductor 7 of cable 145, break contact and armature 146 of relay PO to negative battery. The operation of relay PS at its armatures 147 and 148 and make contacts thereof closes a circuit from a source of power by way of conductors 149 and 151 to the electric motor M thereby causing the motor to be started and actuate the shaft 19 extending from the gear box 17 to set the message sign into operation. The shaft 36 extending from the gear box 17 is also set in motion by the motor M thereby causing the brushes B1 and B2 of the distributor RD and the cam 39 to rotate.

When contacts 41 are brought into engagement with each other by the cam 39, ground is applied to the line L1, contacts 152 of the auto-control AC and thence to the winding of the start magnet SM of the distributor TD, the circuit continuing by way of switch 142 to battery, thus providing revertive control signals for operating the start magnet SM of the stop-start transmitting distributor TD. The start magnet SM operates and attracts the latch 153 thereby setting the distributor TD into operation by releasing the brush B thereof which traverses the segments 2 to 7 of the ring R1 in succession, the brush B being moved by a prime mover such, for example, as an electric motor connected thereto by a suitable friction clutch as is well known in the art of telegraphy.

Let it be assumed, by way of example, that the perforations corresponding to the letter A are moved into alignment with the feeler pins of the tape transmitter TXR at this time, the letter A having the code units 1 and 2 thereof marking and the code units 3, 4 and 5 spacing in character and that an unshift signal had been previously received by the receiving apparatus. The tongues 1 and 2 of the tape transmitter will be in engagement with their marking contacts and the tongues 3, 4 and 5 in engagement with their spacing contacts, thereby applying marking or negative potential to conductors 1 and 2 and spacing or positive potential to conductors 3, 4 and 5 of cable 154, these conductors terminating at one end thereof at segments 2 to 6 of ring R1 of the transmitting distributor TD.

As brush B moves into engagement with segment 2 of the ring R1, negative battery is applied to brush B, segment 1 of ring R2, line L, winding 1 of relay PS, winding of relay LR to ground, thereby operating relay LR. Relay PS, however, remains operated by current flowing through its winding 2 irrespective of the direction of current flowing through its winding 1 for the reason that the flux set up by the winding 2 is of greater strength than the flux set up by the winding 1. The operation of relay LR causes the armature thereof to move into engagement with its contact M and thus apply negative battery to conductor 155, segment 1 of ring R2 of the receiving distributor RD, brush B1, segment 1 of ring R1, conductor 1 of cable 145, winding of relay S1 and thence to positive battery thereby causing relay S1 to operate and lock by way of its armature 156 and make contact thereof, conductor 8 of cable 145, armature 157 and break contact of relay RS to negative battery.

As the distributor brush B engages segment 3 of the ring R1 of the distributor TD, a circuit is completed from negative battery at tongue 2 of the tape transmitter, conductor 2 of cable 154, segment 3 of ring R1, brush B, segment 1 of ring R2 of the distributor TD, line L, winding 1 of relay PS, winding of relay LR to ground, thereby operating relay LR and thus applying negative battery by way of conductor 155, segment 1 of ring R2 of the distributor RD, brush B1, segment 3 of ring R1, conductor 2 of cable 145, to the winding of relay S2 and thence to positive battery. Relay S2 operates and locks by way of its armature 158 and make contact thereof, conductor 8 of cable 145, armature 157 and break contact of relay RS to negative battery.

As the brush B1 traverses segments 4, 5 and 6 of ring R1 of the transmitting distributor TD, the brush B1 of the receiving distributor RD crosses segments 5, 7 and 9 of ring R1 and relay LR receives positive or spacing current from the tongues 3, 4 and 5 of the tape transmitter, thereby causing the armature of relay LR to be moved away from its contact M and brought into engagement with its contact S during this time and thus prevent the operation of relays S3, S4 and S5.

As brush B of the transmitting distributor moves into engagement with segment 7 of ring R1, ground at segment 2 of ring R2 is applied by way of brush B, segment 7 of ring R1, conductor 159 to the winding of the tape step magnet TSM thereby causing the tape step magnet to operate and step the next row of transverse tape perforations into alignment with the feeler pins of the tape transmitter.

As the brush B passes off segment 7 of the ring R1, the tape step magnet releases thereby causing the tongues of the tape transmitter to take settings in accordance with the code units comprising the next signal in the tape. If it is assumed, for example, that this is a shift signal, the tape transmitter tongues 1, 2, 4 and 5 will be moved against their marking contacts and the tongue 3 against its spacing contact. The brush B continues its movement until arrested by the latch 153 which is in the released position for the reason that the contacts 41 associated with the receiving distributor are in open position when the brush B moves into contact with the latch 153. The transmitting distributor completes a rotation in less time than that required for one revolution of the receiving distributor and the brush B of the transmitting distributor is momentarily arrested by the latch 153 and released for operation by the contacts 41 which are controlled by the cam 39 attached to the shaft 36 which operates the brushes of the receiving distributor continuously during the time that the power supply relay PS is operated. This arrangement provides means whereby synchronization of the transmitting and receiving distributors is maintained.

As brush B2 of the receiving distributor traverses segment 1 of ring R4, a circuit is completed from negative battery on ring R3, brush B2, segment 1 of ring R4, conductor 10 of cable 145, armature 161 and break contact of relay REP, conductor 162, winding of relay BF to battery, thereby operating relay BF. The relay BF is a battery feed relay and applies positive and negative battery potentials to the setting magnets of Fig. 15 in accordance with the signals received over the line L. If it be assumed that the signal for the letter A received during this revolution of the receiving distributor represents the first of the characters to be posted by the message sign, the operation of relay BF as the brush B2 traverses segment 1 of ring R4 during its revolution applies positive potential to the marker head magnets in circuit with the commutator brushes hereinbefore referred to, thereby attracting each of the seventy-seven indicating elements of one of the indicator plates to their blank positions. When brush B2 passes off segment 1 of ring R4 relay BF releases. As brush B2 of the receiving distributor moves into engagement with segment 2 of the ring R4, negative battery is applied by way of conductor 9 of cable 145 to the winding of the release relay REL and thence to positive battery thereby causing relay REL to operate.

As the brush B1 of the receiving distributor moves into engagement with segment 10 of ring R1, negative battery is applied by way of conductor 6 of cable 145, armature 163 and make contact of relay S1, armature 165 and break contact of relay S5, armature 166 and break contact of relay S4, armature 167 and break contact of relay S3, armature 168 and make contact of relay S2, conductor A of cable 169, armature 171 and break contact of relay TR1, conductor A of cable 172, winding of character relay A and thence to positive battery, thereby causing the character relay A to operate. The operation of relay A at its armature 173 and make contact thereof applies positive battery to conductor 30 of cable 174 and thence to the winding of relay PC30, the circuit continuing to negative battery, thereby operating relay PC30 and causing it to lock by way of its make contact and armature 175, conductor 176, break contact and armature 177 of relay REL to positive battery.

When brush B2 of the receiving distributor RD moves into engagement with segment 4 of ring R4, negative battery is applied by way of conductor 10 of cable 145, armature 161 and break contact of relay REP, conductor 162 and thence to the winding of the battery feed relay BF, causing relay BF to operate and at its armature 178 and make contact thereof apply negative battery to conductor 179, make contact and armature 181 of relay PC30, conductor 30 of cable 182 and thence by way of brush 63 and segment 4 of ring R30, conductor 30 of cable 183, winding of setting magnet 30 of marker plate 4, conductor 58 of cable 183, ring 58 and brush 68 associated therewith and thence to ground, thereby energizing the magnet 30 in a direction to rotate the corresponding display element 96 to its indicating position.

The operation of relay A at its armature 184 and make contact thereof applies positive battery by way of conductor 51 of cable 174 thereby causing pole changing relay PC51 to operate and lock to positive battery on conductor 176. The operation of relay PC51 applies negative battery at armature 178 by way of conductor 179 and make contact of relay BF, conductor 51 of cable 182, segment 4 of ring R51, thereby energizing magnet 51 in a direction to cause the associated indicator element 96 to be moved to its display position. In a similar manner the operation of relay A at its armature 185 causes the operation of pole changing relay PC55 and the setting magnet 55 of plate 4 of the marker head in a direction to actuate the associated display element 96 to its display position. As armatures 186, 187, 188, 189, 191 and 192 of relay A are brought into engagement with their make contacts, positive battery is applied to conductors 1 to 6 of cable 193 thereby causing the operation of the grouping relays A1 to A6. The operation of relay A1 applies negative battery at armature 178 and make contact of relay BF to the setting magnets 2, 3 and 4 of the marker plate 4, thereby actuating the corresponding indicating elements 96 to their display positions, Fig. 18. In a similar manner the setting magnets 6, 11, 16, 21 and 26 are actuated by relay A2, magnets 10, 15, 20 and 25 by relay A3, magnets 27, 28 and 29 by relay A4, magnets 31, 36, 41 and 46 by relay A5, and magnets 35, 40, 45 and 50 by relay A6. The circuits for the energization of these magnets to their display or indicating positions will best be understood by consideration of the circuits controlled by relay A4 illustrated on Fig. 14 of the drawings.

When relay A4 operates, negative battery at armature 178 and make contact of relay BF is extended by way of conductor 179, make contact and armature 194 of relay A4, conductor 27 of cable 190, break contact and armature 195 of pole changing relay PC27, conductor 27 of cable 182, brush 63 and segment 4 of ring R27, conductor 27 of cable 183, winding of setting magnet 27, conductor 58 of cable 183, ring R58 and associated brush 68 and thence to ground thereby energizing the magnet 27 in a direction to cause the associated display element 96 to be actuated to its display position. The operation of relay A4 at armature 196 thereof applies negative battery by way of conductor 28 of caple 190, break contact and armature of relay PC28, conductor 28 of cable 182, brush 63, segment 4 of ring R28, conductor 28 of cable 183, winding of setting magnet 28, conductor 58 of cable 183, ring R58, brush 68 and thence to ground thereby energizing the magnet 28 in a direction to cause the associated indicating element 96 to assume its display position. In a similar manner the operation of relay A4 at armature 197 thereof causes the energization of the setting magnet 29 and actuation of the associated display element 96 to its indicating position. All of the remaining setting magnets of marker head 4 are energized by positive battery at armature 207 and make contact of relay BF in circuits including break contacts of the unoperated relays A7 to A12 and the unoperated pole changing relays thereby causing the associated indicating elements 96 to assume their non-display positions and blend with the background of the mask.

From the foregoing it will be noted that the operation of the character relay A causes the following indicating elements 96 to be actuated to their display positions: 2, 3, 4, 6, 10, 11, 15, 16, 20, 21, 25, 26, 27, 28, 29, 30, 31, 35, 36, 40, 41, 45, 46, 50, 51 and 55, thereby composing upon the traveling mosaic the letter A, the letter having the general appearance illustrated on Fig. 2 of the drawings. It will be understood that this particular letter A represents but one specific shape or design of the letter A for which the present system is adapted and many other shapes or designs of the letter A may be obtained by the selective operation of the relays A1 to A12 and the pole changer relays PC1 to PC30 controlled by the character relay A in accordance with the wiring arrangement employed therebetween. Each of the relays A1, A2, A3, A4, A5 and A6 locks by way of its make contact and armature 198, conductor 176, break contact and armature 177 of relay REL to positive battery.

As brush B1 passes off segment 10 of ring R1, negative battery is removed from the winding of the character relay A, thereby causing relay A to release. As brush B1 moves into engagement with segment 11 of ring R1, relay RS operates and at its armature 157 removes negative battery from conductor 8 of cable 145 thereby causing relays S1 and S2 to release. As the brush B1 passes off segment 11 of ring R1, relay RS releases and as brush B1 continues its movement, contacts 41 are closed by the cam 39 and apply ground by way of line L1, contacts 152 of the auto-control AC, winding of the start magnet SM of the transmitting distributor and thence to battery thereby operating the start magnet SM and releasing the distributor brush B for a second revolution during which revolution the signal for shift is transmitted over the line L to the receiving apparatus.

As the brush B1 of the receiving distributor moves into engagement with segment 1 of the ring R1, the brush B of the distributor TD is in engagement with segment 2 of the ring R1. The shift signal, it will be recalled, comprises the code units 1, 2, 4 and 5 thereof marking in character and the relays S1, S2, S4 and S5, therefore, are caused to be operated by this signal during the passage of the brush B over segments 2, 3, 5 and 6 of the ring R1 of the distributor TD during which time the brush B1 is traversing segments 1, 3, 7 and 9 respectively of the ring R1 of the receiving distributor RD. Relays S1, S2, S4 and S5 lock by way of their armatures 156, 158, 199 and 201 and make contacts respectively to negative battery on conductor 8 of cable 145 applied thereto at armature 157 and break contact of relay RS.

As brush B2 of the distributor RD moves into engagement with segment 2 of ring R4, negative battery at ring R3 is applied by way of brush B2, segment 2 of the ring R4, conductor 9 of cable 145 and thence to the winding of relay REL, causing relay REL to operate and at its armature 177 remove positive battery from conductor 176 thereby causing relays A1, A2, A3, A4, A5, A6, PC30, PC51 and PC55 to release.

As brush B2 passes off segment 2 of the ring R4, relay REL releases.

As brush B1 moves into engagement with segment 10 of the ring R1, negative battery is applied by way of segment 2 of ring R2, brush B1, segment 10 of ring R1 of the distributor RD, conductor 6 of cable 145, armature 163 and make contact of relay S1, armature 165 and make contact of relay S5, armature 202 and make contact of relay S4, armature 203 and make contact of relay S2, armature 204 and break contact of relay S3, conductor SH of cable 169 and thence to the windings of relays TR1, TR2 and TR3 in parallel to positive battery, thereby causing relays TR1, TR2 and TR3 to operate and lock by way of armature 205 and make contact of relay TR1, break contact and armature 206 of relay RTR to negative battery. The operation of the transfer relays TR1, TR2 and TR3 interrupts the circuits to the letter character relays such, for example, as the letter relays A, B, E and F and transfers the operating circuits from these relays to upper case character relays, the circuit for the character relay A being transferred to the power off relay PO, the circuit for character relay B to the relay employed for setting up a question mark on the display sign, and the circuit for the relays E and F to the character relays 3 and REP as shown on Figs. 13, 14 and 16. The transfer relays TR1, TR2 and TR3 remain operated during the reception of signals received during subsequent revolutions of the receiving distributor RD thereby causing the characters represented thereby to be posted as upper case characters until an unshift signal is received, the unshift signal causing the operation of relay RTR and the release of the transfer relays.

As brush B2 of the receiving distributor moves into engagement with segment 4 of the ring R4, negative battery is applied by way of conductor 10 of cable 145, armature 161 and break contact of relay REP, conductor 162 and thence to the winding of relay BF, thereby causing relay BF to operate and at its armature 207 and make contact thereof apply positive battery through break contacts of relays A1 to A12 and the pole changing relays to the setting magnets of marker plate 1 thereby restoring the indicating elements 96 of the marker plate 1 and eradicating the character, if any, previously set up on the indicating plate in contact at this time with the marker plate 1.

As brush B1 moves into engagement with segment 11 of the ring R1, relay RS operates and at its armature 157 removes negative battery from conductor 8 of cable 145 thereby causing relays S1, S2, S4 and S5 to release.

If it be assumed that the signal corresponding to the digit 1 is transmitted during the third revolution of the transmitting and receiving distributors, relays S1, S2, S3 and S5 will be operated as the brush B1 of the receiving distributor traverses segments 1, 3, 5 and 9 of the ring R1. Relays S1, S2, S3 and S5 lock by way of conductor 8 of cable 145, amature 157 and break contact of relay RS, and thence to negative battery.

As brush B1 engages segment 10 of ring R1, negative battery is applied to conductor 6 of cable 145, armature 163 and make contact of relay S1, armature 165 and make contact of relay S5, armature 202 and break contact of relay S4, armature 208 and make contact of relay S3, armature 209 and make contact of relay S2, conductor Q of cable 169, armature 211 and make contact of relay TR2, conductor 1 of cable 172, winding of character relay 1 and thence to positive battery, thereby causing the character relay 1 to operate and at its armatures 212 and make contacts thereof apply positive battery to conductors 2, 3, 8, 13, 18, 23 and 28 of cable 174 to cause the correspondingly numbered pole changing relays to operate and lock by way of their make contacts and armatures 175 to positive battery on conductor 176 applied thereto at break contact and armature 177 of relay REL. The operation of the character relay 1 at its armatures 213 and make contacts thereof applies positive battery to conductors 7 and 8 of cable 193, thereby causing relays A7 and A8 to operate and lock by way of their make contacts and armatures 198, conductor 176, break contact and armature 177 of relay REL to positive battery.

The operation of relay A7, Fig. 18, causes the marker head magnets 52, 53 and 54 to be selected and the operation of relay A8 selects the marker head magnets 33, 38, 43 and 48. The operation of the battery feed relay BF in response to the engagement of segment 4 of the ring R4 by the brush B2, therefore, applies negative battery to the selected marker head magnets of the marker plate 2 thereby causing the display elements 96 corresponding to the magnets 2, 3, 8, 13, 18, 23, 28, 33, 38, 43, 48, 52, 53 and 54 to be moved to their indicating positions and operate the associated indicating elements 96 to display the digit 1 and the remaining display elements controlled at this time by the marker plate 2 to be moved to their non display positions by positive battery at the make contact and armature 207 of relay BF applied to the remaining magnets of the marker plate 2.

As brush B1 of the receiving distributor moves into engagement with segment 11 of ring R1, relay RS operates and causes relays S1, S2, S3 and S5 to release.

When an unshift signal is received over the line L during a subsequent revolution of the receiving distributor RD, relays S1, S2, S3, S4 and S5 are operated thereby completing a circuit from conductor 6 of cable 145 by way of armature 163 and make contact of relay S1, armature 165 and make contact of relay S5, armature 202 and make contact of relay S4, armature 203 and make contact of relay S2, armature 204 and make contact of relay S3, conductor US of cable 169, winding of relay RTR and thence to positive battery, thereby causing relay RTR to operate in response to the engagement of segment 10 of the ring R1 by the brush B1 and at its armature 206 remove negative battery from one end of the winding of relays TR1, TR2 and TR3. Relays TR1, TR2 and TR3 now release thereby placing the receiving equipment in condition to receive signals corresponding to the lower case or letter characters. The operation of relay BF as brush B2 engages segment 4 of the ring R4, applies positive battery to all the setting magnets of the plates 1, 2, 3 or 4 of the marker head as the case may be, thereby causing the associated indicating plate controlled thereby at this time to display a blank When insufficient slack remains in the tape 141 as, for example, when a complete message has been transmitted by the tape transmitter TXR and no additional signals are set up in the tape by the tape perforator 140, the auto-control contacts 152 are opened thereby interrupting the connection between the line L1 and the start magnet SM of the distributor TD. The start magnet is thus prevented from operating by ground impulses received from the cam operated contacts 41 of the receiving mechanism and the brush B of the transmitting distributor remains at rest in contact with segment 1 of ring R1 of the distributor, in which position positive battery is applied continuously to the line L thereby maintaining the armature of the line relay LR in engagement with its contact S. With the brush B of the distributor TD restrained from movement by the latch 153, the tape step magnet TSM of the tape transmitter is prevented from operating and stepping the tape ahead until the auto-control contacts 152 are again closed.

The system is adapted to repeat a message set up on the character display plates of the traveling mosaic by preventing the energization of the marker head magnets whereby the characters set up in the display plates are unchanged as these plates pass the marker head magnets. This is accomplished in the following manner. The message to be repeated is set up on the tape 141 by the tape perforator 140 followed by a shift signal and a repeat signal. If the last character of the message to be repeated is an upper case character, the message is followed by a repeat signal only and the shift signal is not required to be sent between the message signals and the repeat signal.

When the repeat signal, having the code units 1, 3 and 4 thereof marking and the code units 2 and 5 spacing in character, is received, relays S1, S3 and S4 operate and complete a circuit from conductor 6 of cable 145, armature 163 and make contact of relay S1, armature 165 and break contact of relay S5, armature 166 and make contact of relay S4, armature 214 and make contact of relay S3, armature 215 and break contact of relay S2, conductor F of cable 169, armature 216 and make contact of relay TR1, winding of relay REP, thereby causing relay REP to operate in response to the engagement of segment 10 of the ring R1 by brush B1, relay REP locking by way of its armature 217 and make contact thereof to negative battery at the break contact and armature 218 of relay BL. The operation of relay REP at armature 161 thereof interrupts the circuit between conductor 10 of cable 145 and the winding of the battery feed relay BF, thereby preventing the operation of relay BF as negative battery is applied to conductor 10 of cable 145 by the brush B2 of the distributor RD. With relay BF in an unoperated condition neither negative nor positive potential is applied to the marker head setting magnets and the characters previously set up on the indicating plates of the traveling mosaic are, therefore, unchanged as the plates pass the marker head, and thus the message set up on the traveling mosaic is repeatedly displayed.

When it is desired to discontinue the repetition of the message set up on the traveling mosaic, a blank signal having the code units 3 thereof marking and the code units 1, 2, 4 and 5 spacing in character is transmitted over the line L to the receiving apparatus thereby causing the operation of relay S3 as the brush B1 of the distributor RD moves into engagement with segment 5 of ring R1. As brush B1 engages segment 10 of the ring R1, negative battery is applied by way of conductor 6 of cable 145, armature 163 and break contact of relay S1, armature 219 and break contact of relay S2, armature 221 and make contact of relay S3, armature 222 and break contact of relay S4, armature 223 and break contact of relay S5, conductor BK of cable 169, winding of relay BL and thence to positive battery, thereby causing relay BL to operate and at its armature 218 remove negative battery from the winding of relay REP. Relay REP releases and at its armature 161 reestablishes the circuit from conductor 10 of cable 145 to the winding of the relay BF.

As brush B2 engages segment 4 of the ring R4, negative battery is applied by way of conductor 10 of cable 145, armature 161 and break contact of relay REP, conductor 162 and thence to the winding of relay BF which operates and at its armature 207 and make contact thereof applies positive battery by way of break contacts of the grouping relays A1 to A12 and the pole changing relays to the brushes 63 thereby energizing all the setting magnets of the marker plates 1, 2, 3 and 4 successively as the segments of the rings R1 to R57 are engaged in succession by the brushes 63. All of the indicating elements 96 are thus actuated to their non-display positions as they are brought into operative engagement with the marker head magnets. When each of the display plates has moved into engagement with the marker head magnets, the character or symbol set up thereon is deleted and the repeated message is eradicated.

If it is desired to post another message immediately following the message repeated by the traveling sign without first restoring the traveling mosaic to its blank condition, this may be accomplished by setting the second message up in the perforated tape 141 immediately following the blank signal perforated therein, in which case the operation of the relay BL in response to the blank signal received reestablishes the operating circuit to the battery feed relay BF which operates and applies positive and negative potential selectively to the setting magnets MP1, MP2, MP3 and MP4 under control of the character relays operated during subsequent revolutions of the receiving distributor RD in accordance with the message signals received during these revolutions.

The power may be disconnected from the receiving apparatus of Figs. 12 to 15 and the message sign brought to rest under control of a signal transmitted by the distributor TD over the line L. This is accomplished in the following manner. A shift signal is set up in the perforated tape 141 followed by a power-off signal. If the last character transmitted over the line L by the transmitting distributor TD was an upper case character, the relays TR1, TR2 and TR3 of the receiving apparatus would be operated and the shift signal would not be required to precede the power-off signal. As the power-off signal, having the code units 1 and 2 thereof marking in character and the code units 3, 4 and 5 spacing in character, is received over the line L, relays S1 and S2 operate and complete a circuit from conductor 6 of cable 145 by way of armature 163 and make contact of relay S1, armature 165 and break contact of relay S5, armature 166 and break contact of relay S4, armature 167 and break contact of relay S3, armature 168 and make contact of relay S2, conductor A of cable 169, armature 171 and make contact of relay TR1 and thence to the winding of relay PO, thereby causing the power-off relay PO to operate when segment 10 of the ring R1 is engaged by the brush B1 of the distributor RD.

As armature 146 of relay PO moves away from its break contact, negative battery is removed from conductor 7 of cable 145 extending to winding 2 of relay PS, thereby causing relay PS to release and at its armatures 147 and 148 interrupt the circuit to the motor M, thereby causing the motor to stop and arrest the movement of the traveling mosaic, the brushes B1 and B2 of the receiving distributor and the cam 39. The release of relay PS at its armatures 143 and 144 removes positive and negative battery respectively from the receiving apparatus thereby causing the release of the relays thereof. Relay PO locked by way of its make contact and armature 146 to negative battery and is released by the removal of positive and negative battery from the ends of its winding at armatures 143 and 144 respectively of relay PS.

Switch 142 of the transmitting apparatus is moved to open position thereby preventing the reoperation of relay PS as the brush B of the transmitting distributor TD moves into engagement with segment 1 of the ring R1. The movement of switch 142 to its open position also removes positive battery from one end of the winding of the start magnet SM thereby effectually preventing further movement of the brush B after being arrested by the latch 153.

While the invention has been described in detail with respect to a certain preferred example thereof which gives satisfactory results, it will be understood by those skilled in the art, after understanding the invention, that various modifications and changes may be made without departing from the spirit and scope of the invention, and it is intended, therefore, in the appended claims to cover all such changes and modifications.

What is claimed as new and desired to be secured by Letters Patent of the United States is:

1. A traveling display sign comprising a series of indicator units respectively for displaying the successive characters of a message or other information, said indicator units being mounted to travel in serial order across a display area of the sign, each indicator unit comprising a bank of display elements selectively energizable so as collectively to form any of a plurality of desired characters to be displayed, driving means for causing said series of indicator units to move across said display area at a predetermined speed to display the information, a composing unit comprising a bank of composing elements responsive to predetermined character signals for selectively energizing the display elements of certain of said indicator units to form desired characters thereon, and means operating in synchronism with the movement of said series of indicator units for causing said composing unit to be operatively associated with selected ones of said indicator units and including means to cause the composing unit to travel with a selected indicator unit while operatively associated therewith during a portion of its travel prior to reaching said display area to selectively energize the display elements of the associated indicator unit to form the desired character to be displayed thereby.

2. A traveling display sign comprising a series of indicator units respectively for displaying the successive characters of a message or other information, said indicator units being mounted to travel in serial order across a display area of the sign, each indicator unit comprising a bank of magnetically responsive display elements selectively actuatable to display and non-display positions so as collectively to form any of a plurality of desired characters to be displayed, driving means for causing said series of indicator units to move across said display area at a predetermined speed to display the information, a composing unit comprising a bank of electromagnetic composing elements selectively responsive to electrical signals for producing magnetic fields to selectively actuate the display elements of certain of said indicator units to form desired characters thereon, and means operating in synchronism with the movement of said series of indicator units for causing said composing unit to be magnetically associated with selected ones of said indicator units and including means to cause the composing unit to travel with a selected indicator unit while operatively associated therewith during a portion of its travel prior to reaching said display area to selectively actuate the display elements of the associated indicator unit to form the desired character to be displayed thereby.

3. A traveling display sign comprising a series of indicator units respectively for displaying the successive characters of a message or other information, said indicator units being mounted to travel in serial order across a display area of the sign, each indicator unit comprising a bank of display elements selectively energizable so as collectively to form any of a plurality of desired characters to be displayed, driving means for causing said series of indicator units to move across said display area at a predetermined speed to display the information, a plurality of composing units each comprising a bank of composing elements responsive to predetermined character signals for selectively energizing the display elements of certain of said indicator units to form desired characters thereon, and means operating in synchronism with the movement of said series of indicator units for causing said composing units to be operatively associated successively with selected ones of said indicator units respectively and including means to cause the composing units to travel with the selected units while operatively associated therewith during a portion of their travel prior to reaching said display area to selectively energize the display elements of the associated indicator units to form the desired characters to be displayed thereby.

4. A traveling display sign comprising a series of indicator units respectively for displaying the successive characters of a message or other information, said indicator units being mounted to travel in serial order across a display area of the sign, each indicator unit comprising a bank of indicator elements each selectively movable to a display position and a non-display position so as collectively to form any of a plurality of desired characters to be displayed, driving means for causing said series of indicator units to move across said display area at a predetermined speed to display the information, a composing unit comprising a bank of composing elements responsive to predetermined character signals for selectively moving the indicator elements of certain of said indicator units to display position to form desired characters thereon, and means including a magnet embodied in said indicator elements and effective during the travel of said series of indicator units across the display area for magnetically maintaining the indicator elements in their display positions as determined by said composing elements.

5. A traveling display sign comprising a series of indicator units respectively for displaying the successive characters of a message or other information, said indicator units being mounted to travel in serial order across a display area of the sign, each indicator unit comprising a bank of magnetically responsive indicator elements each selectively actuatable to a display position and a non-display position so as to collectively to form any of a plurality of desired characters to be displayed, driving means for causing said series of indicator units to move across said display area at a predetermined speed to display the information, a composing unit comprising a bank of electromagnetic composing elements responsive to predetermined electrical signals for producing magnetic fields to selectively actuate the indicator elements of certain of said indicator units to display position to form desired characters thereon, and magnetic structure embodied in said indicator elements and effective during the travel of said series of indicator units across the display area for maintaining the indicator elements in their display positions as determined by said electromagnetic composing elements.

6. A system of the character disclosed for displaying message information comprising a traveling belt on which the messages are displayed, means for transmitting message signals in permutation code, means including distributor structure for receiving said signals, a plurality of character relays, means controlled by the signals received for decoding the message signals and causing the character relays to be selectively operated, a train of continuously moving display plates each having a plurality of character display elements thereon settable in accordance with the characters to be displayed, a plurality of composing means controlled by the selected character relays, and means for bringing each of said composing means into operative engagement with said display plates in succession to cause messages to be set up on the traveling belt by the selective operation of said display elements.

7. A device of the character disclosed comprising a traveling belt member having a plurality of groups of settable elements thereon, each of said groups of elements being individual to one of the characters to be displayed, driving means including chain elements attached to said belt for operating the belt continuously, a shaft having a pair of sprocket wheels thereon adapted to be rotated as the belt is operated by said driving means, composing means including a plurality of electromagnets mounted on said shaft and rotatable with the shaft for selectively operating the groups of settable elements in succession in accordance with the characters to be set up on said traveling belt member, and means effective as each group of elements passes said sprocket wheels for controlling the operation of said composing means.

8. A device of the character disclosed having a plurality of connected display plates on which message information is displayed, each of said plates including a plurality of display elements settable in accordance with the characters to be displayed thereby, means for connecting said plates together to form a belt, means including an operating shaft having sprocket wheels thereon in engagement with a pair of endless chains for continuously moving said plates, a second shaft having a pair of sprocket wheels thereon operated by said chains, composing means disposed within said belt and rotatable with said second shaft for selectively actuating the display elements to form characters as the plates are brought into operative engagement with the composing means, and means effective during the engagement of said plates with the composing means for controlling the operation of the composing means in accordance with the message to be displayed by the belt.

9. In a system of the character disclosed, means for transmitting message signals over an outgoing line, receiving means comprising a group of relays responsive to the signals received over said line for storing in succession the characters comprising the message, a plurality of character relays selectively operated by the storage relays in accordance with the character information stored therein, means including a group of pole changing relays operatively actuated to different settings by the selected character relays, a continuously moving chain of connected indicator plates each having a group of settable indicating elements thereon, composing means coincident with each group of indicating elements during a portion only of the travel of said plates, and means effective during the coincidence of the indicating elements and the composing means for causing the indicating elements to take settings to form characters in accordance with settings of the pole changing relays whereby the message received from said transmitting means is set up and displayed by the chain of moving indicator plates.

10. A device of the character disclosed comprising a belt of continuously moving connected indicator plates for displaying a message, a group of closely spaced indicating elements pivotally mounted on each of said plates, means including a permanent magnet within each of said elements for operating the respective elements selectively and maintaining the elements in their operated positions, composing means comprising a plurality of electromagnets adapted to be brought into operative engagement with the indicating elements of each of said plates during a portion of the travel of the plates, and means controlled from a distance for selectively applying control potentials of different polarities to the electromagnets during their engagement with said plates to cause the indicating elements thereof to be operated to positons to display the characters of said message.

11. In a device of the character disclosed, the combination of a rotatable indicating element settable to positions to blend with a suitable background or be distinct therefrom, a background for said element, a permanent magnet secured to the element for operating the element and maintaining the element in either of its set positions, a pair of pole pieces disposed adjacent said magnet, a pair of complementary pole pieces including an electromagnet, means for applying current in either direction to the electromagnet to set up magnetic poles selectively at the complementary pole pieces thereof, and means automatically effective as the device operates for bringing the pole pieces into operative relationship with said complementary pole pieces whereby the indicating element is actuated to a setting in accordance with the direction of current flowing through the electromagnet.

12. In a device of the character disclosed, the combination of a rotatable indicating element settable to positions to blend with a suitable background or be distinct therefrom, a background for said element, a permanent magnet secured to the element for operating the element and maintaining the element in either of its set positions, a pair of pole pieces disposed adjacent said magnet, a pair of complementary pole pieces including an electromagnet, means for applying current in either direction to the electromagnet to set up magnetic poles selectively at the complementary pole pieces thereof, means automatically effective as the device operates for bringing the pole pieces into operative relationship with said complementary pole pieces whereby the indicating element is actuated to a setting in accordance with the direction of current flowing through the electromagnet, and means for thereafter causing the indicating element to be moved away from said complementary pole pieces before a change occurs in the direction of the current applied to the electromagnet.

13. A traveling message sign comprising a traveling mosaic, operating means for causing the mosaic to move continuously, means including distributor structure operated by said operating means for receiving signals corresponding to the characters of the message during succeeding revolutions of the distributor, a plurality of composing means adapted to engage different portions of the mosaic as the mosaic is moved by said operating means, circuit closing means including commutator structure controlled by said operating means in timed relation with the degree of movement of the mosaic for rendering the composing means successively effective to set up characters on the mosaic representative of the message, and means controlled jointly by the circuit closing means and the distributor for successively energizing said composing means in accordance with the message signals received.

14. A system of the character disclosed for displaying message information comprising a traveling belt on which the messages are displayed, means for transmitting message signals in permutation code, means including distributor structure for receiving said signals, a plurality of character relays, means controlled by the signals received for decoding the message signals and causing the character relays to be selectively operated, a plurality of grouping relays controlled by the selected character relays, a train of continuously moving display plates each having a plurality of character display elements thereon settable in accordance with the characters to be displayed, a plurality of composing means controlled by the selected character and grouping relays, and means for bringing each of said composing means into operative engagement with said display plates in succession to cause messages to be set up on the traveling belt by the selective operation of said display elements.

15. A system of the character disclosed for displaying message information comprising a traveling belt on which the messages are displayed, means for transmitting message signals in permutation code, means including distributor structure for receiving said signals, a plurality of character relays, means controlled by the signals received for decoding the message signals and causing the character relays to be selectively operated, a plurality of grouping relays controlled by the selected character relays, a group of pole changing relays settable in accordance with the selected character and grouping relays, a train of continuously moving display plates each having a plurality of character display elements thereon settable in accordance with the characters to be displayed, a plurality of marker plates each having a group of electromagnets thereon controlled by the settings of said pole changing relays, and means for bringing each of said marker plates into operative engagement with said display plates in succession to cause messages to be set up on the traveling belt by the selective operation of said display elements.

16. In a system of the character disclosed, means for transmitting message signals over an outgoing line, receiving means comprising a group of relays responsive to the signals received over said line for storing in succession the characters comprising the message, a plurality of character relays selectively operated by the storage relays in accordance with the character information stored therein, a plurality of grouping relays controlled by the selected character relays, a group of pole changing relays operatively actuated to different settings by the selected character and grouping relays, a continuously moving chain of connected indicator plates each having a group of settable indicating elements thereon, composing means including a plurality of electromagnets adapted to be operatively connected with each group of indicating elements during a portion only of the travel of said plates, and means effective while the operative connection of the indicating elements and the composing means is established for causing the indicating elements to take settings to form characters in accordance with settings of the pole changing relays whereby the message received from said transmitting means is set up and displayed by the chain of moving indicator plates.

17. In a system of the character disclosed, means for transmitting a start signal and a plurality of message signals over an outgoing line, receiving means including a group of relays responsive to said message signals for storing in succession the character information represented thereby, a control relay connected to said line and responsive to said start signal for applying operating potentials to said receiving means, means for maintaining said control relay in an operative condition after the start signal has terminated, a plurality of character relays selectively operated by the storage relays in accordance with the character information stored therein, means including a group of pole changing relays operatively actuated to different settings by the selected character relays, a continuously moving chain of connected indicator plates each having a group of settable indicating elements thereon, composing means coincident with each group of indicating elements during a portion only of the travel of said plates, and means effective during the coincidence of the indicating elements and the composing means for causing the indicating elements to take settings to form characters in accordance with settings of the pole changing relays whereby the message received from said transmitting means is set up and displayed by the chain of moving indicator plates.

18. A system of the character disclosed for displaying message information comprising a continuously moving belt on which the messages are displayed, means for transmitting signals including message signals, shift and unshift signals, receiving means including a first group of character relays corresponding to certain characters of a message and a second group of character relays corresponding to other characters of a message, means responsive to said shift signal for selecting said first group of character relays, means responsive to said unshift signal for selecting said second group of character relays, means responsive to the message signals received for selecting character relays from the selected one of the groups, and means controlled by the selected character relays for causing the message represented thereby to be set up and displayed by the moving belt.

19. A system of the character disclosed for displaying a plurality of message characters upon a continuously moving belt, a perforated tape on which the message characters are set up, manipulative means for setting up the message characters on said tape, a tape transmitter settable to different settings by said perforated tape, a distributor including a start magnet for transmitting message character signals over an outgoing line in accordance with the settings of said tape transmitter, an auto control device intermediate said manipulative means and the tape transmitter and operable by the tape in accordance with the degree of slack in the tape loop thus formed, a continuously operating distributor operatively connected to said line for receiving the message character signals, means controlled by the message character signals received for setting up the message represented thereby on said moving belt, and means controlled by the position of said receiving distributor for operating said start magnet periodically in accordance with the operated condition of said auto control device.

20. A character display device comprising a plurality of closely spaced indicating elements settable to different positions to blend with a background or be distinct therefrom, a plurality of permanent magnets individual to and mounted within the indicating elements, means for pivotally mounting each of said elements whereby the axis of rotation of certain of the magnets is substantially normal to the axis of rotation of the remaining ones of said elements and the magnets of one axis of rotation are interspersed with the magnets of the other axis of rotation, means including a plurality of electromagnets individual to each of said indicating elements for attracting the permanent magnets thereof and causing the associated elements to be selectively actuated to their set positions, and means for selectively energizing said electromagnets in accordance with the character to be displayed.

21. A traveling display sign system comprising a series of indicator units respectively for displaying the successive characters of a message or other information, said indicator units being mounted to travel in serial order across a display area of the sign, driving means for causing said series of indicator units to move across said display area to display the information, means including distributor means for transmitting message signals for actuating selected ones of said indicator units, means including a start magnet for intermittently operating said transmitting distributor means, means including a receiving distributor for receiving said message signals and applying them to said indicator units during the travel thereof, and revertive control means comprising electrical contact elements operating in synchronism with said receiving distributor for transmitting revertive start signals to operate the said start magnet and cause the transmitting distributor to remain in synchronism with said receiving distributor.

22. A traveling display sign system comprising a series of indicator units respectively for displaying the successive characters of a message or other information, said indicator units being mounted to travel in serial order across a display area of the sign, driving means for causing said series of indicator units continuously to move across said display area to display the information, means including stop-start distributor means for transmitting message signals for actuating selected ones of said indicator units, means including a start magnet for controlling said transmitting distributor means, means including a continuously operable receiving distributor for receiving said message signals and applying them to said indicator units during the travel thereof, and revertive control means comprising electrical contact elements operating in synchronism with said receiving distributor for transmitting revertive start signals to operate the said start magnet and cause the stop-start transmitting distributor to remain in synchronism with said continuously operable receiving distributor.

MERTON L. HASELTON.
CHARLES S. WHITNEY, JR.